US012687065B2

(12) United States Patent
Senchuk

(10) Patent No.: US 12,687,065 B2
(45) Date of Patent: Jul. 21, 2026

(54) WINDOW INSERT, INSERT KIT, AND METHODS

(71) Applicant: Earl Senchuk, Marquette, MI (US)

(72) Inventor: Earl Senchuk, Marquette, MI (US)

( * ) Notice: Subject to any disclaimer, the term of this patent is extended or adjusted under 35 U.S.C. 154(b) by 421 days.

(21) Appl. No.: 18/196,421

(22) Filed: May 11, 2023

(65) Prior Publication Data

US 2023/0366257 A1 Nov. 16, 2023

Related U.S. Application Data

(60) Provisional application No. 63/340,919, filed on May 11, 2022.

(51) Int. Cl.
*E06B 5/00* (2006.01)
*E06B 3/26* (2006.01)
*E06B 3/54* (2006.01)

(52) U.S. Cl.
CPC .............. *E06B 5/00* (2013.01); *E06B 3/2605* (2013.01); *E06B 3/5454* (2013.01)

(58) Field of Classification Search
CPC .......... E06B 3/2605; E06B 3/285; E06B 3/28; E06B 3/5454; E06B 3/78; E06B 5/00; E06B 7/23; E06B 2009/005
See application file for complete search history.

(56) References Cited

U.S. PATENT DOCUMENTS 4,407,099 A * 10/1983 McLaughlin ............. E06B 3/28
49/478.1
4,450,660 A * 5/1984 Dean ..................... E06B 3/6608
29/455.1
4,967,530 A * 11/1990 Clunn ..................... E04B 9/242
52/204.591
5,737,885 A * 4/1998 Stoyke ...................... E06B 3/28
52/202
9,976,335 B2 * 5/2018 Pardue ....................... E06B 9/02
11,933,102 B1 * 3/2024 Gingold .............. E06B 3/66342
(Continued)

FOREIGN PATENT DOCUMENTS

GB 2031497 A * 4/1980 ............. E06B 3/285

OTHER PUBLICATIONS

Windowdressers.org website. Published at least as early as Mar. 29, 2022.

*Primary Examiner* — Christine T Cajilig
(74) *Attorney, Agent, or Firm* — Howard & Howard Attorneys PLLC

(57) ABSTRACT

A window insert assembly is disclosed for reducing window energy loss and for damping sound. Also disclosed are parts in a window insert kit to build a window insert and methods for installing the window insert into a window well. In one embodiment, the window insert comprises an outer frame assembly with a gasket frame seated in a gasket channel of the outer frame and planks of an inner frame seated in an inner channel of the outer frame assembly. The inner frame suspends layers of plastic wrap. In an alternative embodiment, the outer frame is in the form of a U-channel or adhesive foil with the gaskets adhered to its outer perimeter. In another embodiment, the outer perimeter of the inner frame comprises a stiffener groove. Here, the outer frame is in the form of a T-shaped stiffener with gasket adhered to its top.

11 Claims, 10 Drawing Sheets

(56) References Cited

U.S. PATENT DOCUMENTS

| | | | | |
|---|---|---|---|---|
| 2002/0162288 | A1 * | 11/2002 | Kane | B44C 5/005 52/204.59 |
| 2004/0112553 | A1 * | 6/2004 | Minnich | E06B 3/28 160/378 |
| 2017/0268282 | A1 * | 9/2017 | Bacon | E06B 3/9684 |

* cited by examiner

WINDOW INSERT, INSERT KIT, AND METHODS

This application claims priority to Provisional Patent Application No. 63/340,919 filed May 11, 2022, the entire disclosure of which is hereby incorporated by reference and relied upon.

BACKGROUND OF THE INVENTION

Field of the Invention

The invention relates generally to window inserts, and more particularly to window inserts that are buildable from a kit.

Description of Related Art

Window inserts are currently available on the market. These window inserts typically come preassembled and require skilled window frame measurement skills by the user and often volunteer labor to install. What is needed are good quality, energy conserving, sound dampening, easy to build window insert kits that have small package footprints and have a wide measuring error tolerance that makes their use extremely simple for the common homeowner to build and install.

SUMMARY OF THE INVENTION

Disclosed herein is a window insert assembly that meets the demands described above. In preferred forms, the window insert assembly is easy to assemble from a kit.

In one form, the window insert assembly comprises an outer frame assembly, a gasket frame, and an inner frame assembly.

In one form, the outer frame is made from an assembly of outer frame long members and outer frame short members.

In one form, individual outer frame members have a cross-sectional profile defining an inner channel and a gasket channel separated by a common wall (base).

In one form, the inner channel is substantially U-shaped whereas the gasket channel is substantially J-shaped thereby having a J-U profile.

In one form, the channels of the J-U profile open in opposite directions.

In one form, the U-shaped inner channel is defined by the common wall at the base of the U, and defined by an opposed first flange and second flange extending from the base.

In one form, the first flange and second flange are toed inwards.

In one form, the J-shaped gasket channel is defined by the common wall and a long flange and a short flange extending from each side of the common wall also known as the base.

In one form, the gasket channel comprises a pair of opposed in-steps protruding into the gasket channel and whereby the in-steps are spaced in parallel relation to the common wall.

In one form, one or more edges of the J-U profile have a tapered corner.

In one form, members of the outer frame assembly are cut to a predetermined length and have ends mitered at 45 degrees whereby the members can be assembled at their mitered ends into a square or rectangle. In some embodiments, sharp mitred corners can be radiused.

In one form, in an assembled outer frame assembly (operable configuration), the gasket channel faces outwards and the inner channel faces inwards.

In one form, the window insert assembly comprises a gasket frame.

In one form, the gasket frame comprises a pair of long gasket members and a pair of short gasket members. In cases where the window well is square, the long gasket members and short gasket members can be of the same length.

In one form, the gasket members are elongate foam members.

In one form, the elongate foam members are closed celled.

In one form, the gasket members have gasket mitres such that the gasket members can be assembled to form a rectangle or square.

In one form, the gasket members are seated within the gasket channels of complementing outer frame members and thereby encircle an assembled outer frame assembly.

In one form, the gasket members are held in position by a pair of opposing in-steps protruding into the gasket channels.

In one form, the inner frame assembly comprises an inner frame.

In one form, the inner frame is constructed of an assembly of long planks and short planks.

In one form, the long planks and short planks are of equal length. In one form, the long planks are longer than the short planks.

In one form, the long planks and short planks are secured using screws such as flathead or cabinet screws for example.

In one form, two screws are utilized to secure each junction between the long and short planks.

In one form, the screws are flat head.

In one form, the long and short planks are arranged to form a rectangular or square frame when secured by fasteners.

In one form, counter-sunk or counter bored pre-formed holes extend through the planks.

In one form, guide holes extend at least partially into the planks.

In one form, the pre-formed holes and the guide holes are aligned for quick assembly using screws to join the short planks and long planks.

In one form, the inner frame comprises a first long plank, a second long plank, a first short plank, a second short plank, and an optional third short plank if additional structural support is needed in the inner frame.

In one form, a first short dual sided tape and a first long dual sided tape are adhered on respective long plank and short plank outside perimeter surfaces of the inner frame.

In one form, a first plastic wrap is placed over the inner frame with an inner adhesion face stuck to the first short dual sided tape and first long dual sided tape strips. Excess plastic wrap is then trimmed away whereas one side of the inner frame is covered by the first plastic wrap.

In one form, a second short dual sided tape and a second long dual sided tape are adhered on respective outer adhesion faces of the first plastic wrap.

In one form, a second plastic wrap is placed over the opposite side of the inner frame with an inner adhesion face stuck to the second short dual sided tape and second long dual sided tape. Excess plastic wrap is then trimmed away whereas the opposing side of the inner frame is covered by the second plastic wrap.

In one form, the first and second plastic wraps are transparent or semi-transparent and can be heat shrinking type.

In one form, strips of boxing tape are used to enclose exposed first and/or second plastic wrap at the corners of the inner frame.

In one form, the short planks and long planks are manufactured of wood or a polymer.

In one form, the short planks and long planks have a generally square or rectangular cross-sectional profile.

In one form, the short plank and/or long planks comprise one or more elongate channels extending along the outer surface of the long and short planks.

In one form, the elongate channels define the formation of ribs extending from one end to an opposing end of the short and long planks.

In one form, the elongate channels are covered when the short planks or long plank is fully seated in the inner channel of the outer frame long or short members.

In one form, a heat gun is used to heat one or more of the first plastic wrap and second plastic wrap causing consequent removal of wrinkles and thereby improving visual clarity and sound reduction of the window insert assembly.

In one form, the inner frame assembly is seated in the inner channel of the outer frame assembly such that the outer frame assembly bounds the inner frame assembly on all sides.

In one form, the window insert assembly is provided as a window insert kit.

In one form, the window insert kit comprises: adhesive, inner frame planks, screws, dual sided tape, a first plastic wrap, and an optional second plastic wrap all for constructing the inner frame. The window insert kit also comprises: outer frame long and short members having an opposed channel to build the outer frame, and gasket strips to construct the gasket frame.

In one form, the steps for building a window insert assembly from a kit and installing the window insert assembly in a window frame are disclosed.

In one form, a low-cost window insert assembly comprises an inner frame. The inner frame is assembled to be planar from a first long plank, a second long plank, a first short plank, a second short plank and an optional third short plank and secured by fasteners and or adhesives.

In one form, one broad side of the inner frame of the low-cost window assembly is covered with a first plastic wrap which can be in the form of a polyolefin heat shrink film. The plastic wrap is cut to fully cover the broad side of the inner frame and cover the outer perimeter of the inner frame and secured using a double-sided tape therebetween. Plastic wrap extending beyond the outer perimeter of the inner frame can be trimmed away.

In one form, the opposing broad side of the inner frame of the low-cost window assembly is covered with a second plastic wrap which can be in the form of a polyolefin heat shrink film. The plastic wrap is cut to fully cover the broad side of the inner frame and cover the outer perimeter of the inner frame and secured using a double-sided tape between the first plastic wrap and the second plastic wrap. Plastic wrap extending beyond the outer perimeter of the inner frame can be trimmed away.

In one form, the low-cost window insert assembly comprises a series of elongate U-channels of plastic or metal that are pressed over the outer perimeter of the inner frame thereby encapsulating the ends of the first plastic wrap and second plastic wrap therein.

In one form, the low-cost window insert assembly comprises an adhesive backed metal foil that is applied over the outer perimeter of the inner frame and adhered directly to the exposed surface of the second plastic wrap.

In one form, a plurality of elongate gaskets having a generally square or rectangular profile are secured along the outer perimeter of the inner frame directly to an exposed base surface (adhesive face) of the U-channel or adhesive backed metal foil.

In one form, the elongate gaskets have a thickness of approximately 1.125" and are compressible to approximately 0.125". The elongate gasket is preferably: UV tolerant, weatherable, has a relaxed pace memory, is closed cell (for insulation value and sound dampening), has good sound dampening and sealing qualities, can be secured to itself using adhesives, and is compatible with paints over time.

In one form, a heat shield film is applied over top the outdoors facing plastic wrap to block UV light.

In one form, a facing shield (decorative shield) is applied to the low-cost window insert bridging between the buildings window frame and the inner frame of the low-cost window insert thereby covering the gaskets from view.

In one form, to minimize warping of the inner frame and to speed assembly, the outer perimeter of the planks of the inner frame comprise a stiffener groove configured to receive the leg (stiffener leg) of a T-shaped stiffener. Here the inside angle of the base (stiffener base) of the T abuts the outer perimeter. A gasket is then secured to the exposed adhesive face of the T-shaped stiffener using an adhesive or adhesive tape.

In one form, one embodiment of a method for assembling a window insert with a T-shaped stiffener comprises the steps of: obtaining a first long plank, a second long plank, a first short plank, a second short plank and optionally a third short plank wherein each plank comprises an elongate stiffener groove. Arranging the planks to form an inner frame of the desired window insert size profile whereby the stiffener groove is continuous about the outer perimeter of the inner frame. Advancing screws through pre-formed holes in the planks thereby forming a secure inner frame. Placing a dual side tape on the front facing surface of the planks. Obtaining and stretching a first plastic wrap across the broad side of the window and adhering it to the dual side tape while leaving a perimeter portion of the first plastic wrap available for tucking into the adjacent stiffener groove. Obtaining and placing dual sided tape on the opposed facing surface of the planks. Obtaining and stretching a second plastic wrap across the broad side of the inner frame and adhering it to the dual sided tape while leaving a perimeter portion of the second plastic wrap available for tucking into the adjacent stiffener groove. Tucking the perimeter portion of the first and second plastic wrap into the stiffener groove. Obtaining a plurality of T-shaped stiffeners with a gasket adhered to the T top of the T-shaped stiffener and advancing the T-shaped stiffeners into the respective stiffener grooves. In an optional step, one or more facing shields are placed to overlap the inner frame and the respective window frame thereby hiding the gasket.

In one form, planks used in constructing the inner frame are manufactured from wood.

In one form, planks used in constructing the inner frame are manufactured from a plastic extrusion preferably from recycled ocean plastic.

In one form, the stiffener grove comprises a plurality of elongate stiffener ribs which extend along the length of the stiffener groove.

In one form, the leg of the T-shaped stiffener comprises a plurality of elongate stiffener ribs which extend along the length of the stiffener leg.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein.

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e. 100, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Disclosed herein are a variety of embodiments of a window insert assembly 100. In preferred forms, the window insert assembly 100 is easy to assemble from a window insert kit 101, in other forms, the insert assembly is pre-assembled.

Figure 1:
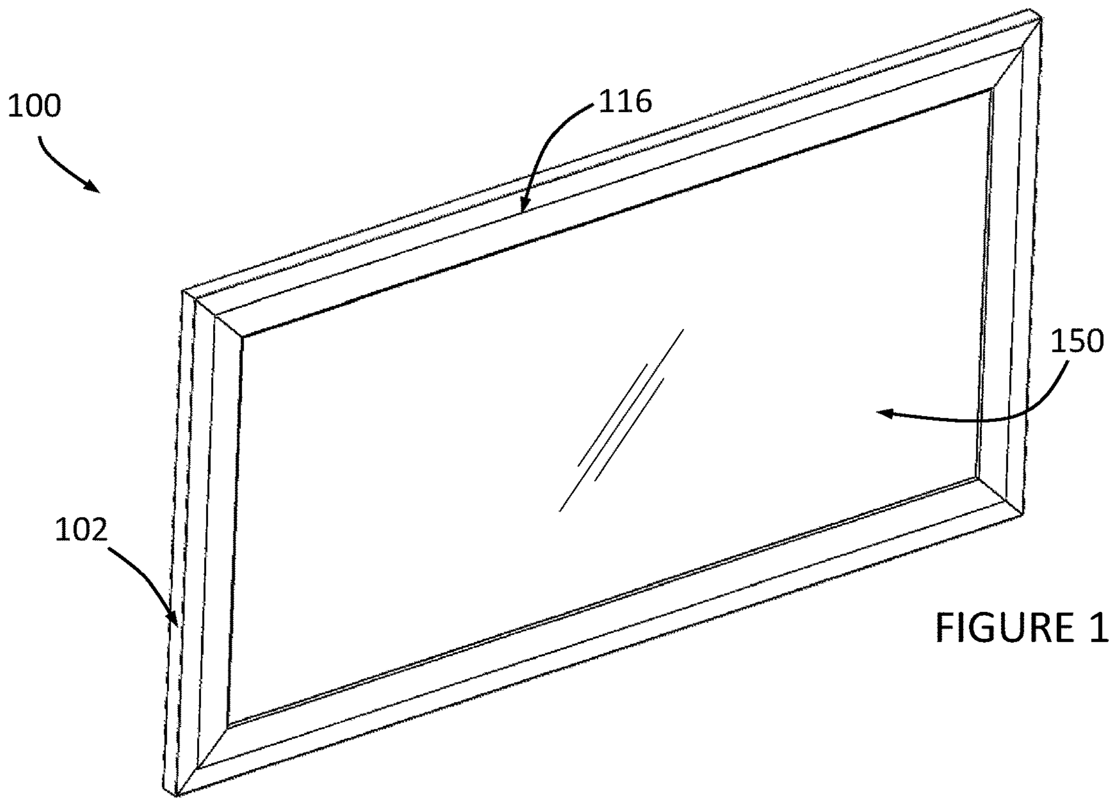
FIG. 1 depicts a perspective view of a window insert assembly.
Figure 2:
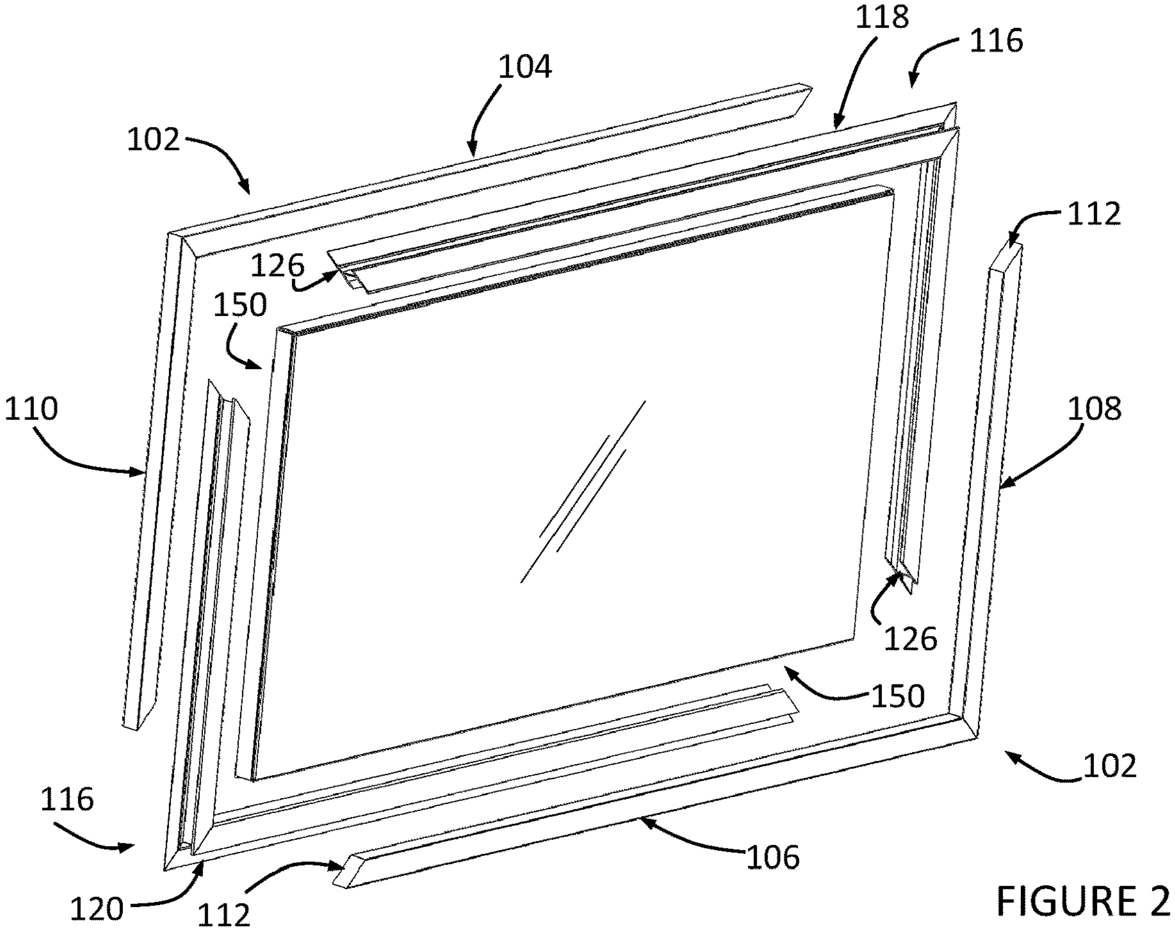
FIG. 2 depicts a partially exploded perspective view of the outer frame assembly of the window insert assembly of FIG. 1.
Figure 8A:
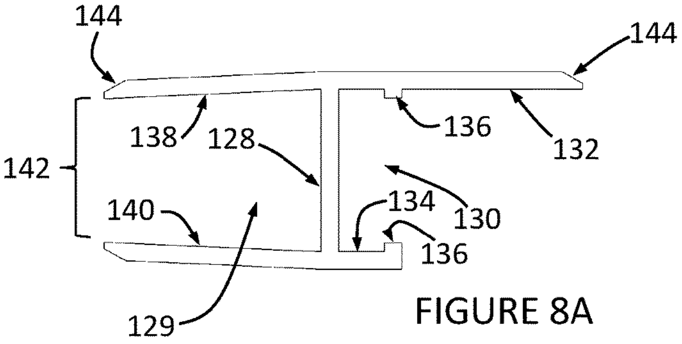
FIG. 8A depicts an end view of an outer frame member utilized to construct the window insert assembly of FIG. 1.
Figure 8B:
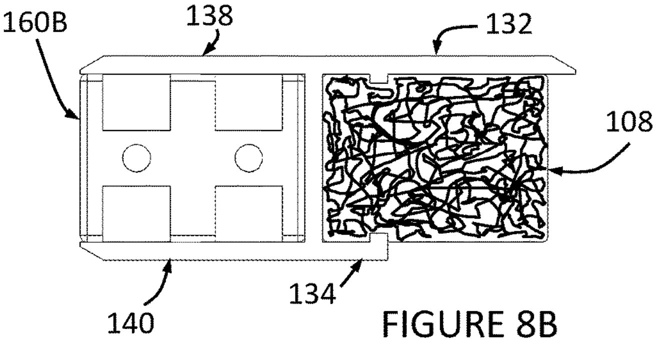
FIG. 8B depicts an end view of the outer frame member with a gasket and a plank housed within an inner channel and gasket channel of the outer frame member of FIG. 8A.

As illustrated in FIGS. 1-2, the window insert assembly 100 comprises an outer frame assembly 116, a gasket frame 102, and an inner frame assembly 150. The outer frame assembly 116 is made from an assembly of a first outer frame long member 118, a second outer frame long member 120, a first outer frame short member 122, and a second outer frame short member 124. As illustrated in FIG. 8, the individual outer frame members have a cross-sectional profile defining an inner channel 129 and a gasket channel 130 separated by a common wall 128. As illustrated in the embodiment, the inner channel 129 is substantially U-shaped whereas the gasket channel 130 is substantially J-shaped whereby the outer frame member can be described as having a J-U shaped profile. The channels of the J-U profile open in opposite directions as further depicted in FIG. 8. The U-shaped inner channel 129 is defined by the common wall 128 at the base of the U, and defined by an opposed first flange 138 and second flange 140 extending from the common wall base. Further noted in the Figure, the first flange 138 and second flange 140 are toed inwards 142. The toed in first flange 138 and second flange 140 are deflected outwards (FIG. 8B) when a plank (such as second short plank 160B) from an inner frame 152 is seated within inner channel 129. The plastic wrap and the two-way tape are not shown in FIG. 8B. FIG. 8B also illustrates a gasket (such as first short gasket 108) seated in the gasket channel 130. With this arrangement, it is clear that the gasket can be compressed as needed to assist the window insert to fit within a window frame despite small errors in measurement.

The J-shaped gasket channel 130 is defined by the common wall 128 and a long flange 132 and a short flange 134 extending from each side of the common wall 128. The gasket channel 130 comprises a pair of opposed in-steps 136 protruding into the gasket channel 130 and whereby the in-steps are spaced in parallel relation from the common wall 128. One or more edges of the J-U profile have a tapered corner 144.

Figure 7:
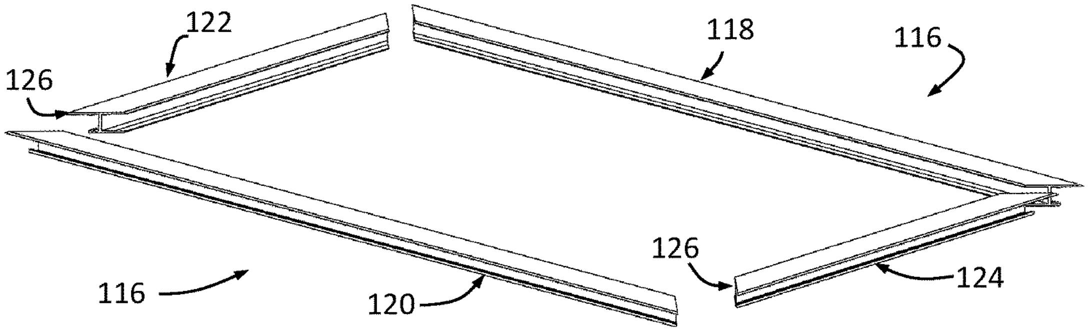
FIG. 7 depicts an exploded perspective view of an outer frame assembly utilized to construct the window insert assembly of FIG. 1.

As noted in FIG. 7, members of the outer frame assembly 116 are cut to a predetermined length and have ends mitered at 45 degrees whereby the members can be assembled at their mitered ends 126 in an operable configuration into an open square or rectangle. In this operable configuration, the gasket channel 130 faces outwards and the inner channel 129 faces inwards.

Figure 6:
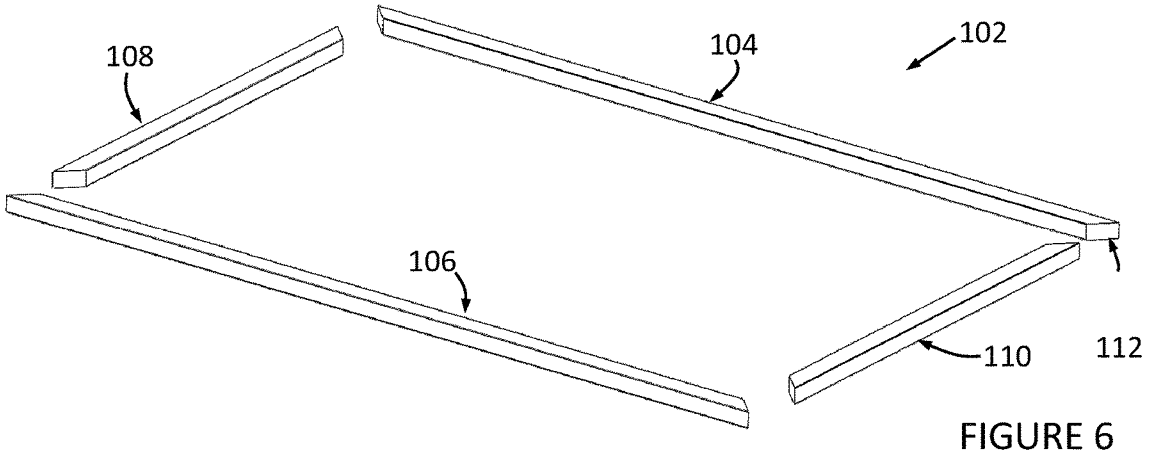
FIG. 6 depicts an exploded perspective view of a gasket frame utilized to construct the window insert assembly of FIG. 1.

The window insert assembly 100 comprises a gasket frame 102 as noted in FIG. 6. The gasket frame 102 comprises a pair of long gasket members (first long gasket 104 and second long gasket 106) and a pair of short gasket members (first short gasket 108 and second short gasket 110). The gasket members are elongate foam members having a square or rectangular cross-section although other cross-sections such as circular or elliptical could also be effective. In preferred embodiments, the gasket members have gasket mitres 112 (45 degrees) such that the gasket member forms a rectangle or square like a picture frame. In alternative embodiments, the gasket member ends are cut at 90 degrees and assembled into a similar square or rectangle. Adhesives can be used to bond ends of gasket members together.

The gasket members are seated within the gasket channels 130 of complementing outer frame members and thereby encircle an assembled outer frame assembly in an operable configuration. When a gasket is placed in the gasket channel 130, a good portion of the gasket (0.5-0.75 inch) is exposed on one side. Therefore, when a homeowner's window frame is measured, there can be a rather broad tolerance for error and still have the window insert fit snugly within the window frame since the gasket can be compressed to various degrees and will make up for these measurement issues. The gasket members (first long gasket 104, second long gasket 106, first short gasket 108, and second short gasket 110) are held in position in the gasket channels by a pair of opposing in-steps 136 protruding into the gasket channels and squeezing gasket that is pushed into the channel.

The inner frame assembly 150 comprises an inner frame 152. The inner frame is constructed of an assembly of long planks (first long plank 154, second long plank 156) and short planks (first short plank 158, second short plank 160). In some embodiments, the long and short planks are of equal length.

Figure 3:
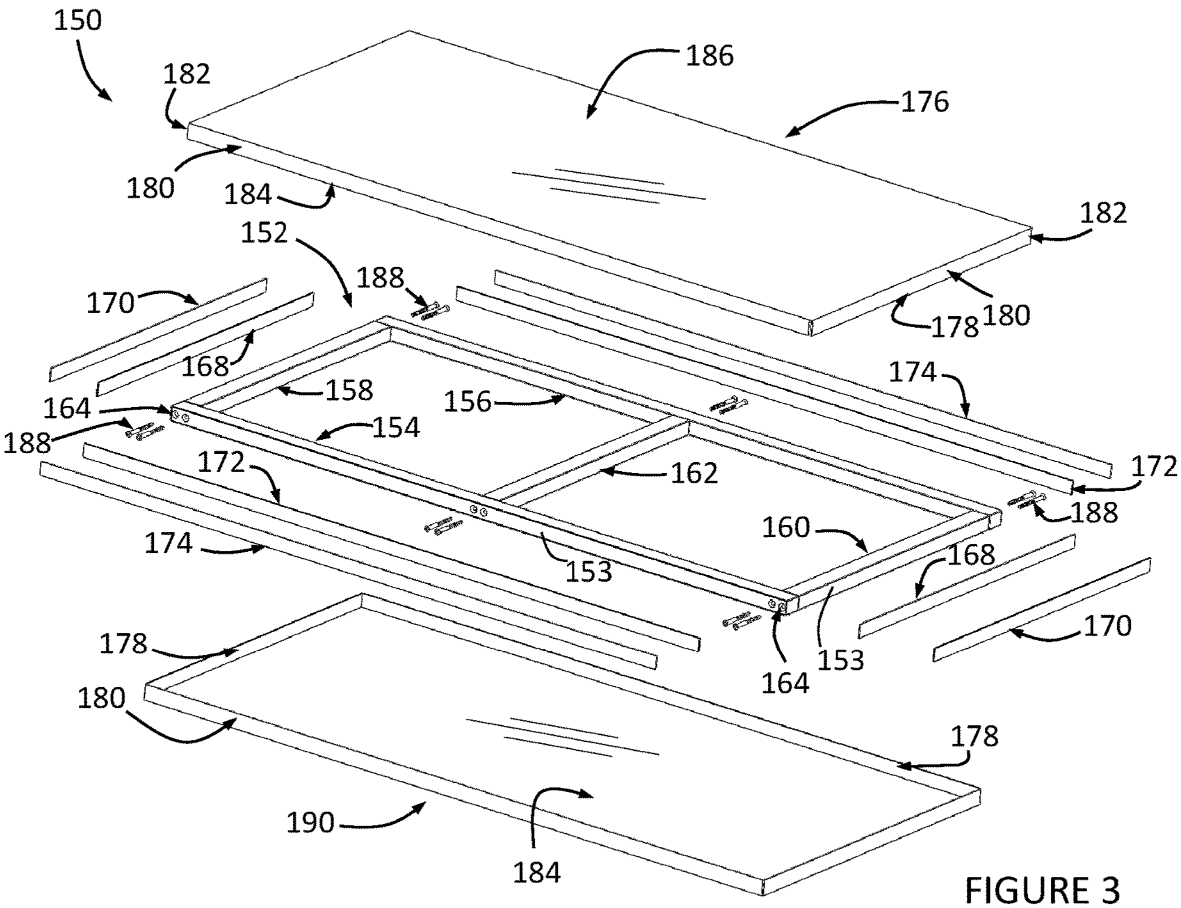
FIG. 3 depicts an exploded perspective view of the inner frame assembly of the window insert assembly of FIG. 1.
Figure 4:
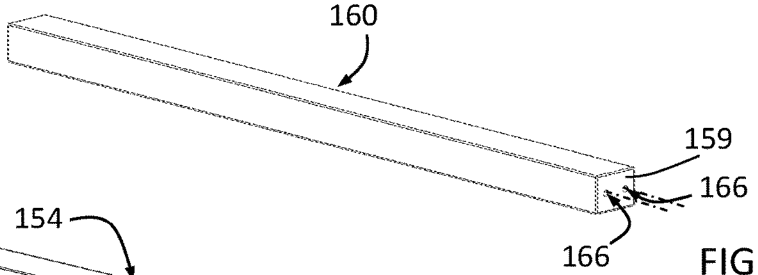
FIG. 4 depicts a perspective view of a short plank utilized to construct the inner frame of the window insert assembly of FIG. 1.
Figure 5:
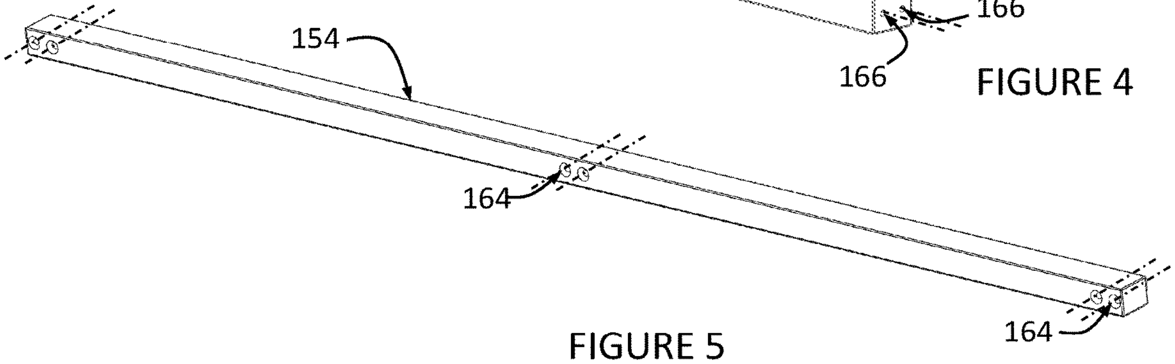
FIG. 5 depicts a perspective view of a long plank utilized to construct the inner frame of the window insert assembly of FIG. 1.

As noted in FIG. 3, the long planks and short planks are secured to each other using screws 188 that are driven across the joints between aligned pre-formed holes 164 and guide holes 166. In preferred forms, one or two parallel spaced screws (i.e. flathead screws, cabinet screws) are utilized to secure each junction between the long and short planks. The long planks and short planks are arranged to form a rectangular or square frame when secured by fasteners. Counter sunk or counter bored pre-formed holes 164 extend through the planks and are aligned with guide holes 166 that extend at least partially into the planks. The pre-formed holes 164 and the guide holes 166 are aligned for quick assembly using screws between the short planks and long planks.

The inner frame 152 comprises a first long plank 154, a second long plank 156, a first short plank 158, a second short plank 160, and an optional third short plank 162 if additional structural support is needed intermediately in the inner frame 152 between the first short plank and second short plank. A first short dual sided tape 168 and a first long dual sided tape 172 are adhered on respective long plank and short plank outside perimeter surfaces of the inner frame 15. A first plastic wrap 176 is placed over the inner frame 152 with an inner adhesion face 178 stuck to the first short dual sided tape 168 and first long dual sided tape strips 172. Excess first plastic wrap 176 is then trimmed away whereas one side of the inner frame is covered by the first plastic wrap 176.

A second short dual sided tape 170 and a second long dual sided tape 174 are then adhered on respective outer adhesion faces 180 of the first plastic wrap 176. A second plastic wrap 190 is placed over the opposite side of the inner frame 152 with an inner adhesion face 178 stuck to the second short dual sided tape 170 and second long dual sided tape 174. Excess plastic wrap is then trimmed away whereas the opposing side of the inner frame 152 is covered by the second plastic wrap 190. Strips of boxing tape can be used to enclose exposed first and/or second plastic wrap at the corners of the inner frame after trimming corners 182.

Figure 9:
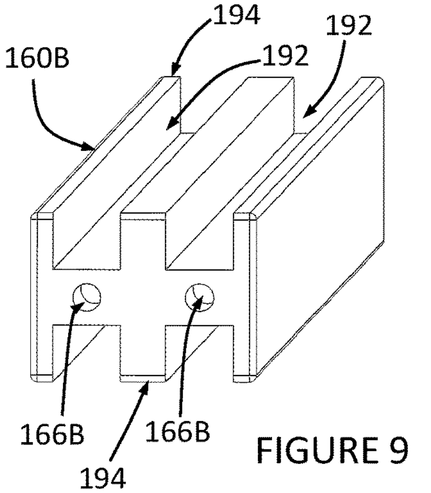
FIG. 9 depicts a perspective view of a short plank utilized to construct an inner frame of a window insert assembly.

The short planks and long planks are manufactured of wood or a polymer which included recycled polymers. In preferred embodiments, the short planks and long planks have a generally square or rectangular cross-sectional profile. In some embodiments such as illustrated in FIG. 9, the short plank and/or long planks comprise one or more elongate channels 192 extending along the outer surface of the long and short planks on opposing sides. The elongate channels define the formation of ribs 194 extending from one end to an opposing end of the short and long planks. The elongate channels 192 are covered when the short planks or long planks are fully seated in the inner channel of the outer frame long or short members.

A heat gun is used in some methods to heat one or more of the first plastic wrap 176 and second plastic wrap 190 causing consequent removal of wrinkles and thereby improving visual clarity and sound reduction of the window insert assembly 100. The inner frame assembly 150 is seated in the inner channel 129 of the outer frame assembly 116 such that the outer frame assembly bounds the inner frame assembly 150 on all sides.

Figure 10:
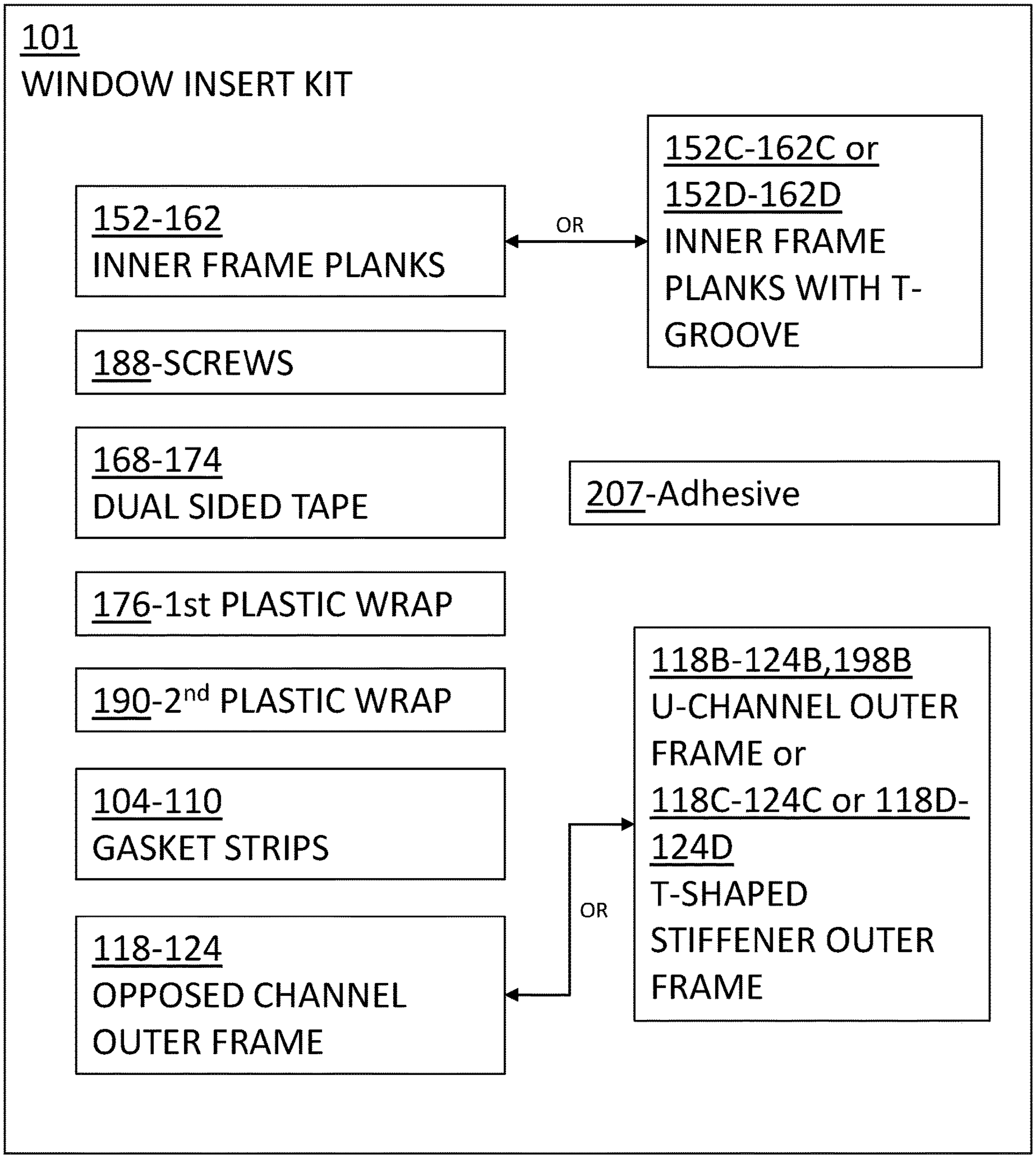
FIG. 10 is a graphic depicting parts that can be included in a window insert kit.

As depicted in FIG. 10, the window insert assembly 100 is provided as a window insert kit 101. The window insert kit 101 comprises: adhesive 270, inner frame planks 152-162, screws 188, dual sided tape 168-174, a first plastic wrap 176, and an optional second plastic wrap 190 all for constructing the inner frame assembly 150. The window insert kit 101 also comprises: outer frame long and short members 118-124 which has opposed channels to build the outer frame, and gasket strips 104-110 to construct the gasket fame 102. In some embodiments, the window insert kit may include scissors or similar cutting device operable for trimming plastic wrap and/or a heat gun. In some embodiments, window insert kit 101 can comprise alternative components depending on the type of inner frame planks (with or without T-groove), and depending on the type of outer frame members (J-U profile, U-channel or metal foil, T-shaped). These alternatives are depicted in FIG. 10 and discussed further below.

Figure 11:
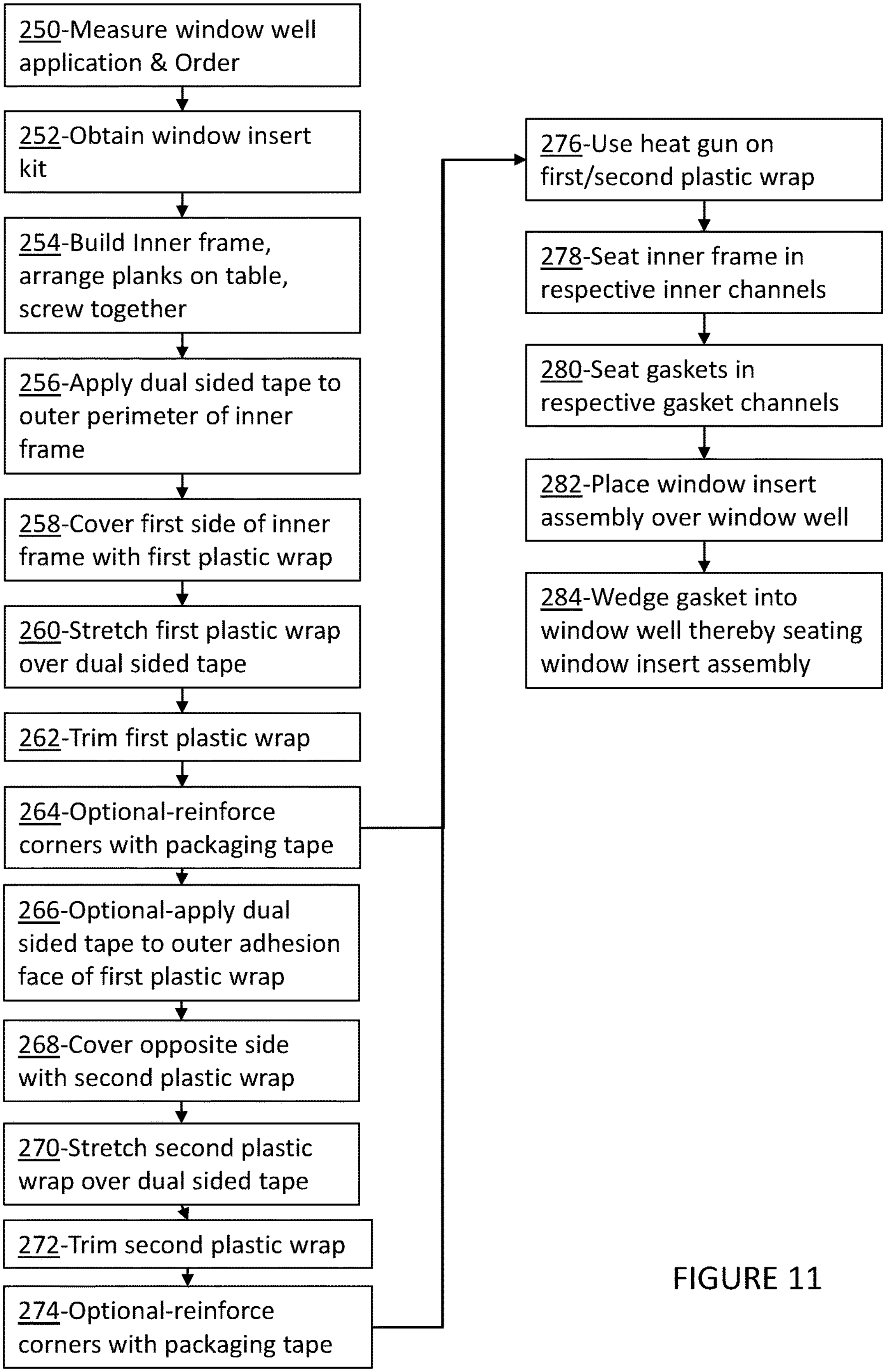
FIG. 11 is a graphic depicting one method of constructing a window insert assembly and installing the window insert into a window well.
Figure 12:
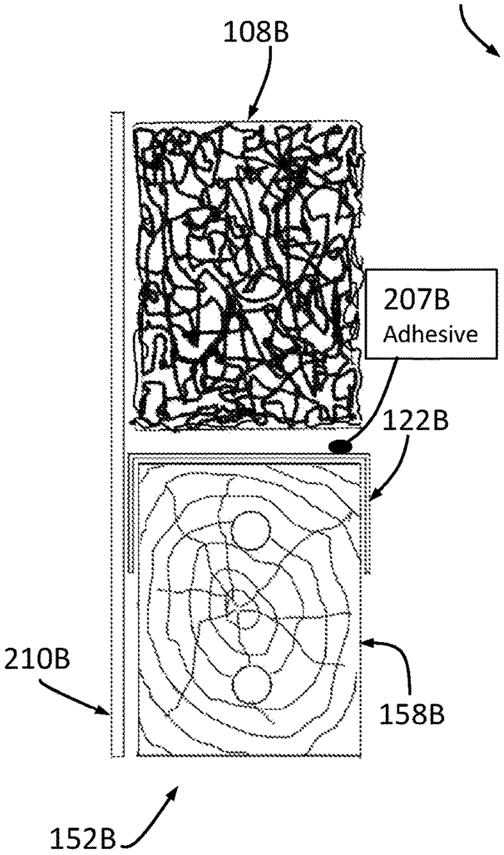
FIG. 12 is a simplified graphic depicting a cross-section of a portion of a low-cost window insert assembly (plastic wraps and tapes removed)

FIG. 11 illustrates steps in a process for assembling a window insert assembly 100 from a window insert kit 101 consistent with the embodiment of FIGS. 1 and 2. In a first step, a user measures the interior size of the indoor facing window frame and places an order for the appropriately sized window insert assembly (250). The correct size window insert kit is obtained (252) either from a store's inventory or mail order. The user then builds the inner frame (254) by arranging the short planks and long planks on a table to obtain the proper size inner frame 152, aligning the pre-formed holes 164 with the guide holes 166, and driving the screws to secure the planks together whereby the screw heads are seated in the counter-sunk/counter bored holes. The user then applies the dual sided tape to the four outer perimeter 153 surfaces of the inner frame 152 (step 256) leaving one side of the tape exposed. A first side of the inner frame 152 is then covered with the first plastic wrap 176 (step 258), and the first plastic wrap is stretched over the exposed dual sided tape (260). The excess first plastic wrap is then trimmed (262). As an option, the trimmed corners are reinforced with packaging tape (264). Also as an optional step, a second side of the inner frame 152 is covered with a second plastic wrap 190 and includes additional steps. Dual sided tape is applied to the outer adhesion face 180 of the first plastic wrap (266). The second side of the inner frame 152 is then covered with a second plastic wrap (268) and the second plastic wrap is stretched over the exposed dual sided tape (270). Excess second plastic wrap is then trimmed away (272). The exposed corners of the inner frame can be then reinforced with packaging tape if so desired (274). The user then proceeds to use a heat gun on the first and second (if present) plastic wrap (276) to remove wrinkles in the plastic wraps, improve clarity, and reduce noise. The inner frame is then seated in the respective inner channels 129 of the respective outer frame members (278). The gaskets are then seated in the gasket channels 130 of the respective outer frames (280), however, in some embodiments, the gaskets can be pre-seated in the outer frame members at the factory. The assembled window insert assembly 100 is then placed over the indoors facing window frame (282), and each gasket is wedged into the window frame/well using a tool such as a plastic spatula as needed as the window insert assembly 100 is fully seated in the window frame (284). This technique can be modified as needed for minor differences in the outer frame assembly.

FIGS. 12-16 depict an embodiment of a low-cost window insert assembly 100B. This window insert assembly comprises an inner frame 152B that is substantially the same as the inner frame 152 of the FIG. 3 embodiment. As before, inner frame 152B is assembled to be planar from a first long plank, a second long plank, a first short plank 158B, a second short plank 160B and an optional third short plank and secured by screws 188 through pre-formed holes 164, however other fasteners and/or adhesives can also be used.

Like the FIG. 3 embodiment, one broad side of the inner frame 152B of the low-cost window insert assembly 100B is covered with a first plastic wrap 176B which can be in the form of a polyolefin heat shrink film. The first plastic wrap 176B is cut to fully cover the broad side of the inner frame 152B and cover the outer perimeter 153B of the inner frame 152B using a lengths of dual side tape (i.e. a first short dual side tape 168B or a first long dual side tape 172B respectively) therebetween. Upon folding over the outer perimeter, plastic wrap extending beyond the outer perimeter 153B of the inner frame 152B can be trimmed away.

Figure 13:
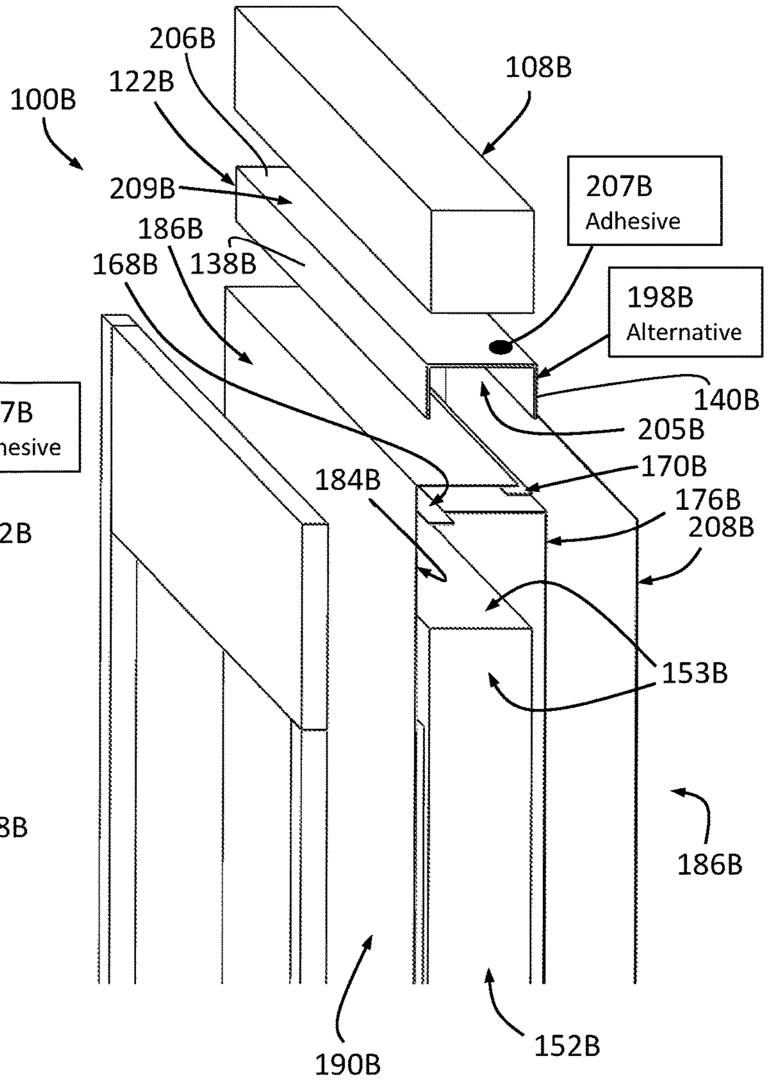
FIG. 13 depicts an exploded perspective view of a section of a low-cost window insert assembly.

As further depicted in FIG. 13, the opposing broad side of the inner frame 152B of the low-cost window insert assembly 100B is covered with a second plastic wrap 190B which can be in the form of a polyolefin heat shrink film. The second plastic wrap is cut to fully cover the broad side of the inner frame 152B and cover the outer perimeter 153B of the inner frame using a dual side tape (i.e. a second short dual side tape 170B or a second long dual side tape 174B respectively) between the first plastic wrap 176B and the second plastic wrap 190B. Plastic wrap extending beyond the outer perimeter 153B of the inner frame 152B can be trimmed away.

In this embodiment, the low-cost window insert assembly 100B comprises an outer frame assembly 116B constructed of a series of U-channel outer frame members of plastic or metal that are pressed over the outer perimeter 153B of the inner frame 152B thereby encapsulating the ends of the first plastic wrap 176B and second plastic wrap 190B within the capture space 205B of the U-channel.

Figure 14:
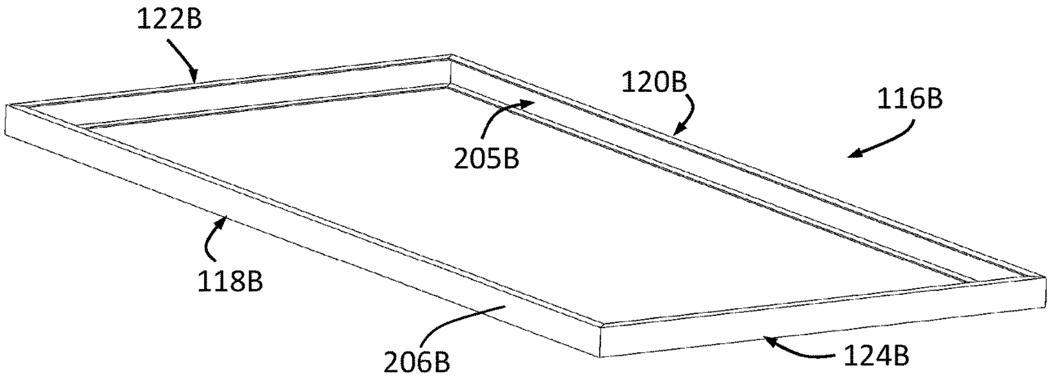
FIG. 14 depicts a perspective view of an outer frame assembly of U-channel used in a low-cost window insert assembly.
Figure 15:
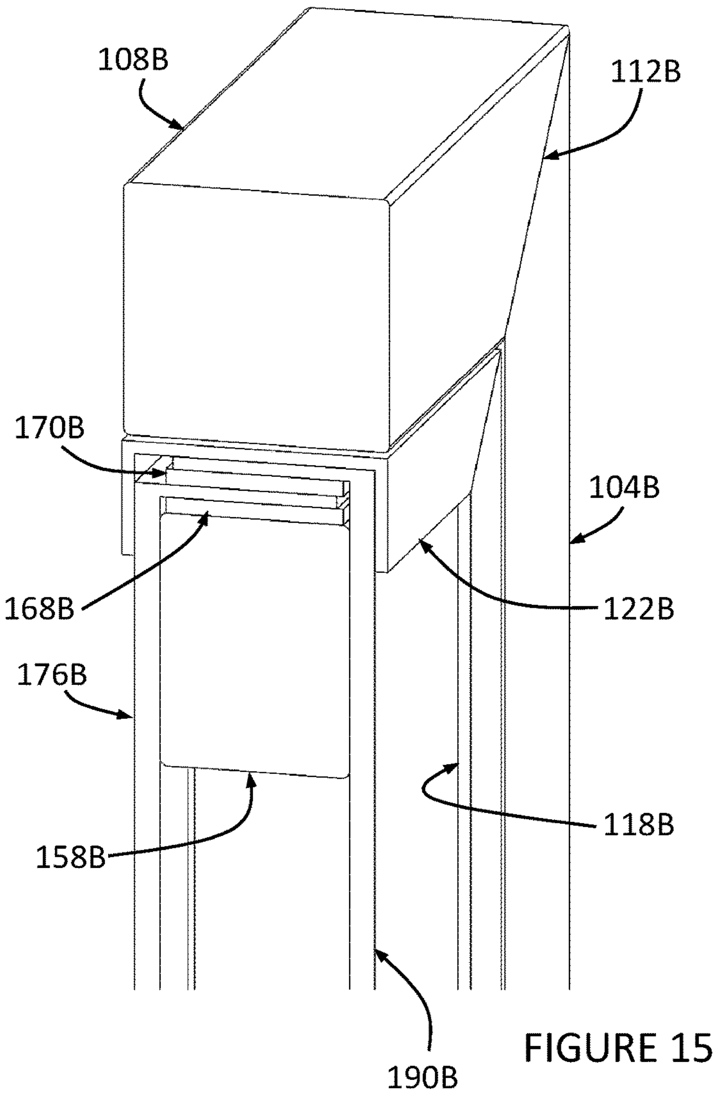
FIG. 15 depicts a sectional view of a portion of a low-cost window insert assembly through a plane perpendicular to the window insert assembly.
Figure 16:
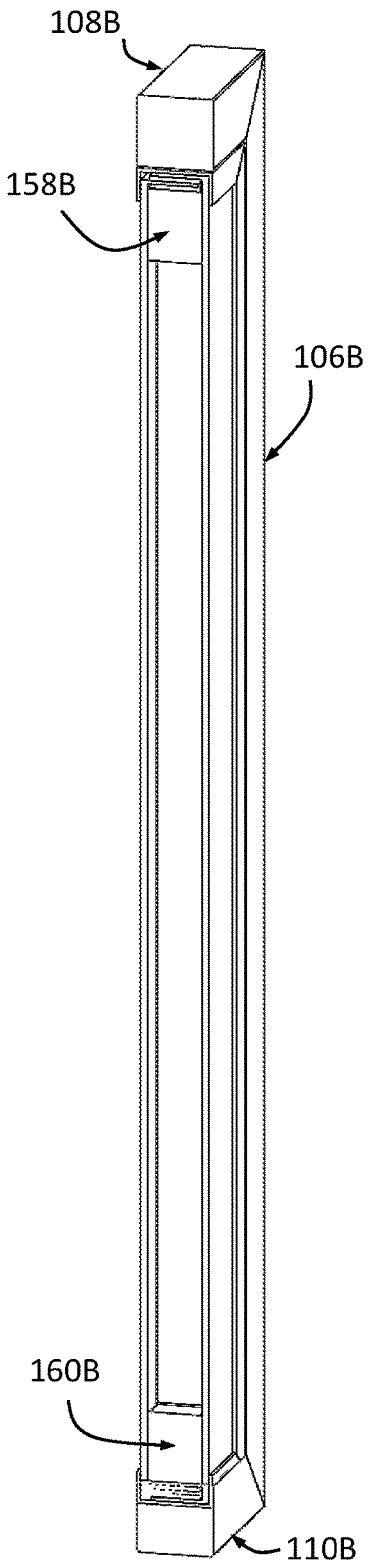
FIG. 16 depicts a sectional view of a portion of a low-cost window insert assembly through a plane perpendicular to the window insert assembly.

FIG. 14 depicts the outer frame assembly 116B which comprises first outer frame long member 118B, second outer frame long member 120B, first outer frame short member 122B, and second outer frame short member 124B. An adhesion face 206B on the outer base 209B of the U-channel is utilized to adhere gasket material using an adhesive 207B.

A plurality of elongate gaskets having a generally square or rectangular profile are secured directly to the adhesive face 206B of the outer frame members (i.e. U-channel or adhesive backed metal foil). This positioning of all four gaskets is depicted in the FIGS. 1 and 2 embodiments with the exception that the J-U shaped outer frame members that are depicted in FIGS. 1 and 2 are replaced with the U-channel members depicted in FIG. 14.

In preferred embodiments, the elongate gaskets have a thickness of approximately 1.125" and are compressible to approximately 0.125". They can also have a width of approximately 0.75". The elongate gasket is preferably: UV tolerant, weatherable, has a relaxed pace memory, is closed cell (for insulation value and sound dampening), has good sound dampening and sealing qualities, can be secured to itself using adhesives, and is compatible with paints over time. It should also be noted that a heat shield film can applied over top the outdoors facing plastic wrap to block UV light.

As noted in FIG. 13, as an alternative to the elongate U-channels, the low-cost window insert assembly 100B comprises an adhesive backed metal foil 198B that is applied over the outer perimeter of the inner frame adhered directly to the exposed surface of the second plastic wrap 190B and a portion of the broad faces of the first plastic wrap 176B and second plastic wrap 190B. Although not rigid like the U-channel, it assumes a U-channel shape and it serves the purpose of encapsulating the inner frame and plastic wrap.

Figure 17:
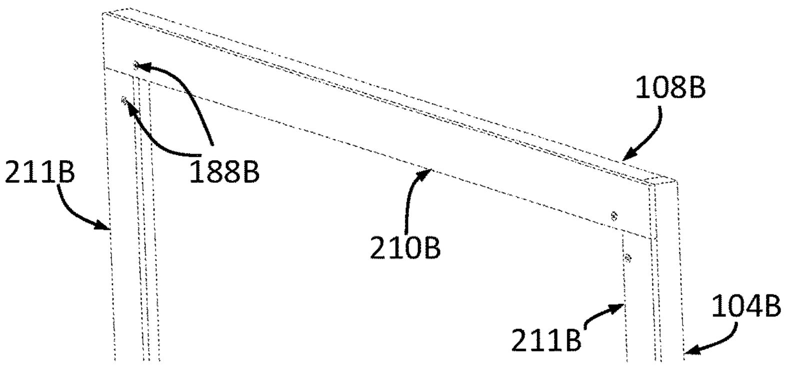
FIG. 17 depicts a partial perspective view of facing shield that can be used to cover gasket material in a window insert assembly.

FIG. 17 depicts various facing shields of varying lengths that can be utilized over portions of the window insert assembly. In one form the facing shield is in the form of an elongate wood or polymer decorative trim having a generally rectangular cross-section. The facing shields can be sized for the required length as noted in the Figure whereas a single window insert can include pairs of short facing shields 210B, and long facing shields 211B. The facing shields can be secured to the inner frame 152B using screws 188B, tape, or other adhesives. The facing shield can be applied to the low-cost window insert bridging between a buildings window frame and the inner frame of the low-cost window insert thereby covering the gaskets from view.

Figure 18:
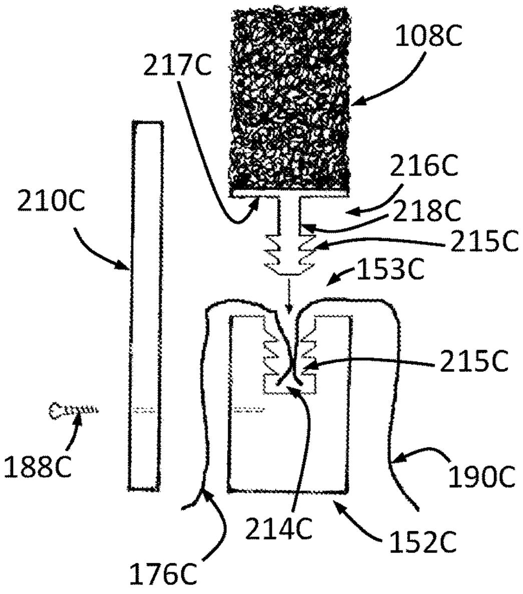
FIG. 18 is a simplified graphic depicting a cross-section through a plane perpendicular to the window insert assembly of a window insert assembly having a ribbed T-shaped stiffener.
Figure 19:
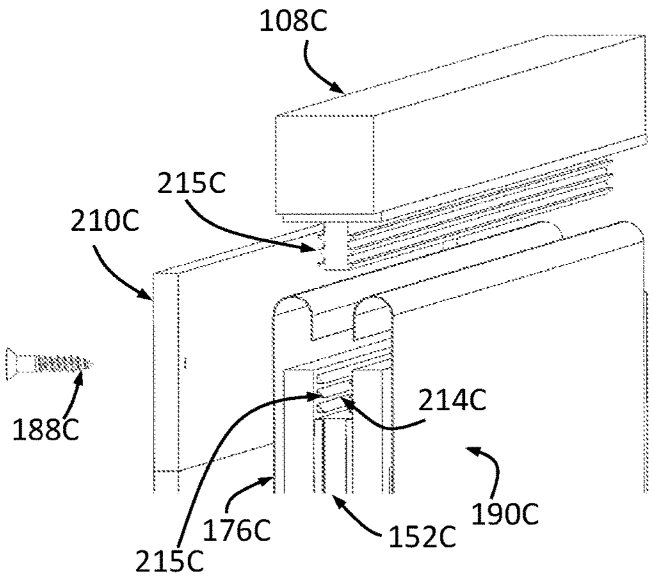
FIG. 19 depicts a partially exploded perspective cross-sectional view of a window insert assembly having a ribbed T-shaped stiffener.
Figure 20:
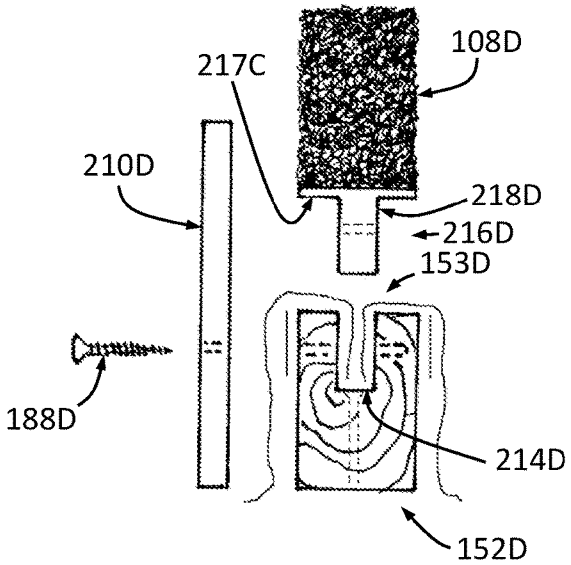
FIG. 20 is a simplified graphic depicting a cross-section through a plane perpendicular to the window insert assembly of a window insert assembly having a T-shaped stiffener.
Figure 21:
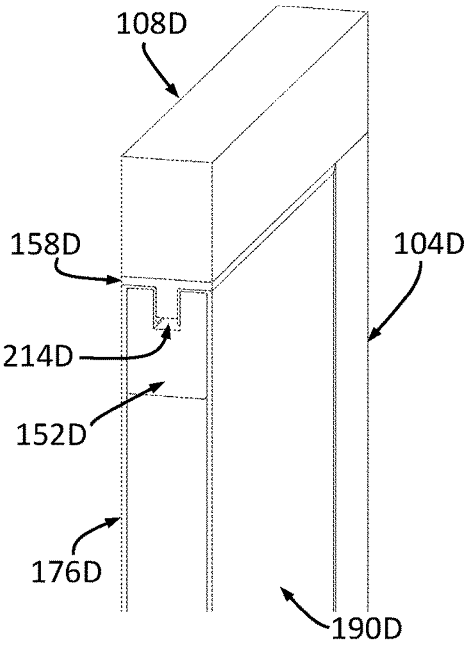
FIG. 21 depicts a partial cross-sectional view of a window insert assembly having a T-shaped stiffener.

FIGS. 18-19 depict yet another embodiment of construction of a window insert to minimize warping of the inner frame and to speed assembly. In this embodiment, the outer perimeter 153C of the planks of the inner frame 152C comprise a stiffener groove 214C configured to receive the stiffener leg 218C that extends perpendicular from the stiffener base 217C of outer frame long member and short members and are otherwise in the form of a T-shaped stiffener 216C. Here the inside angle of the stiffener head abuts the outer perimeter when the stiffener leg 218C is fully inserted. Stiffener ribs extend from one or more of the stiffener leg 218C and stiffener groove 214C and interlock when the T-shaped stiffener is inserted into the stiffener groove but can slide out when the window is disassembled. A gasket such as first short gasket 108C is then secured to the exposed T top of the stiffener base 217C using an adhesive or adhesive tape (in some embodiments, the gaskets are pre-adhered to the stiffener base at the factory). FIG. 20-21 depicts a window insert assembly that is essentially the same as the embodiment of FIG. 18-19 however, the stiffener leg 218D and/or stiffener groove 214D is absent stiffener ribs. The ribbed version is conducive for manufacture from an extruded metal such as aluminum, vinyl, recycled ocean plastic, extruded hemp, or other polymer, whereas the embodiments without ribs are easily manufactured from woods as well as the materials just listed.

Figure 22:
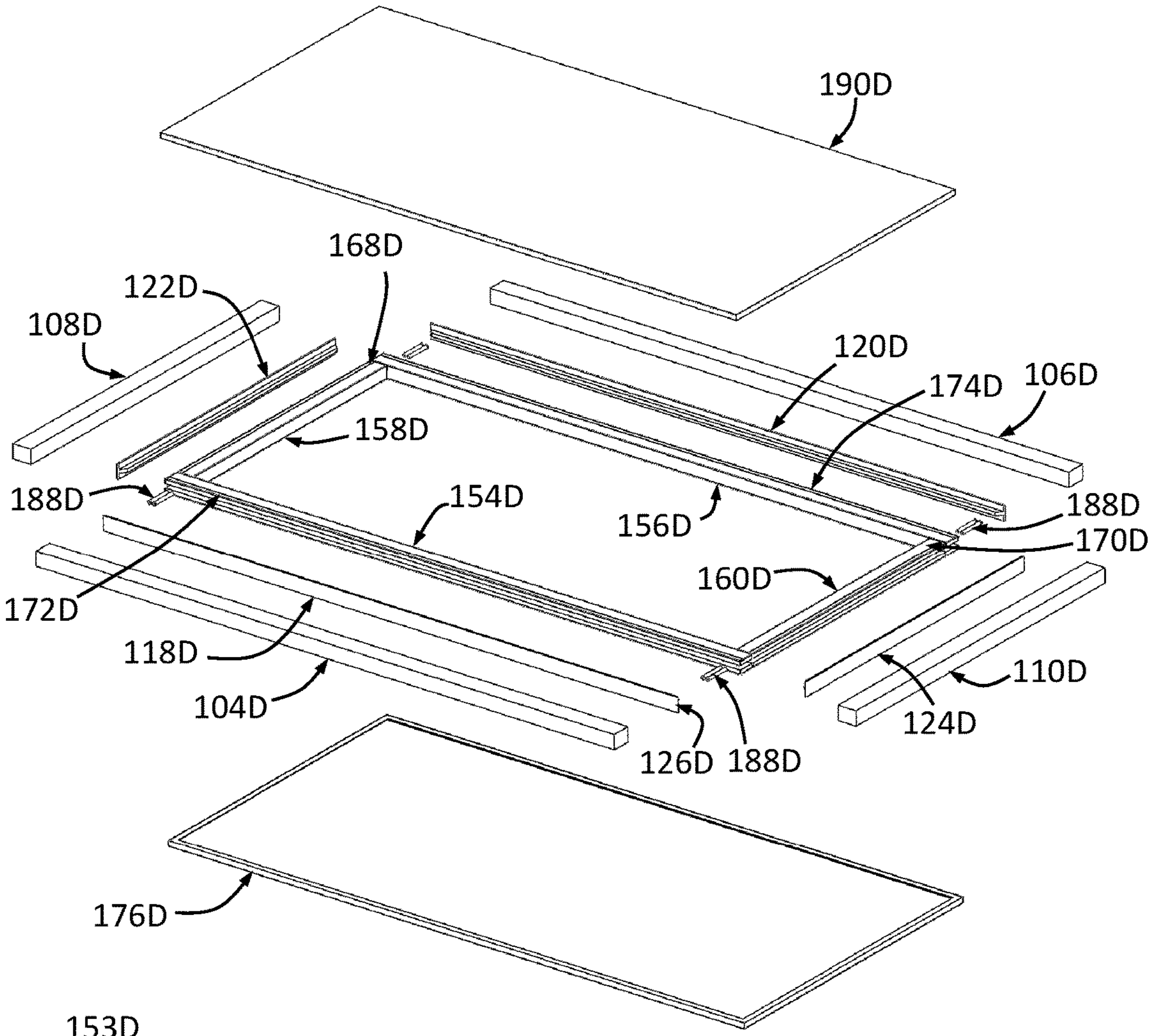
FIG. 22 depicts an exploded perspective view of a window insert assembly having a T-shaped stiffeners in the outer frame assembly.
Figure 23:
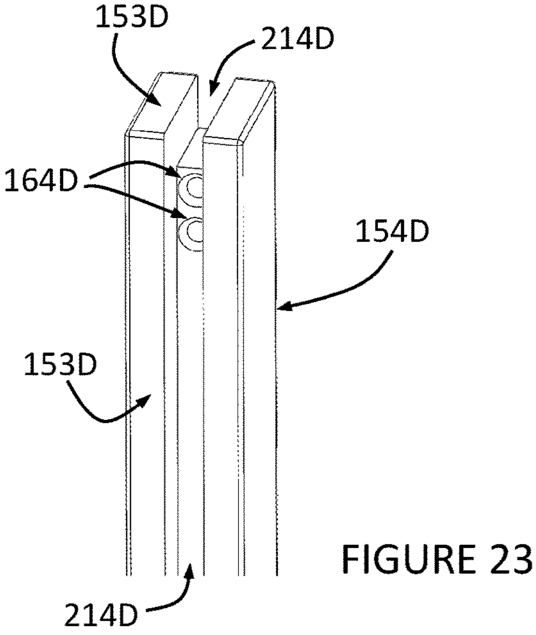
FIG. 23 is a partial perspective view of a member of the inner frame (plank) having a stiffener groove along both a long side and short side.
Figure 24:
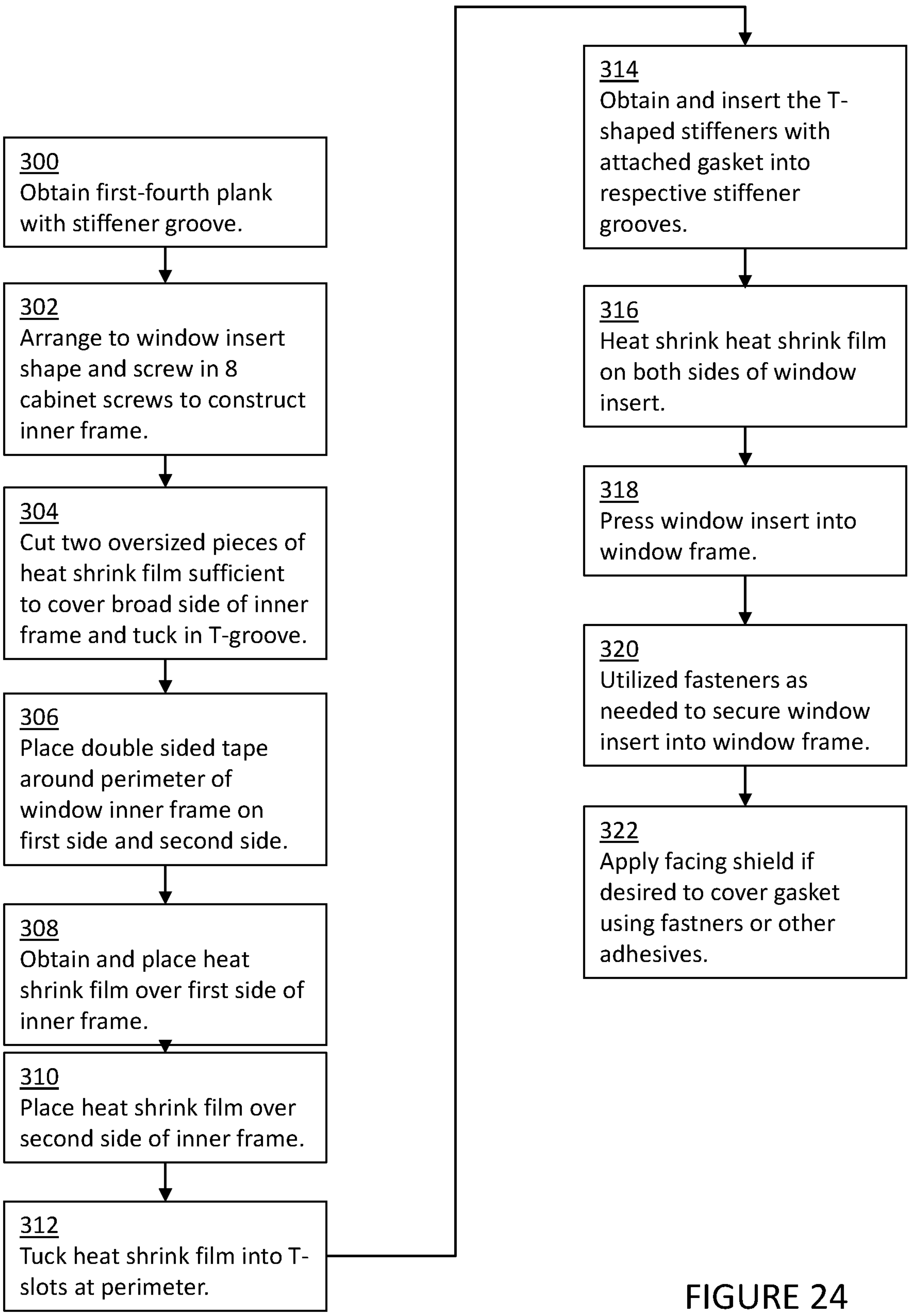
FIG. 24 is a graphic depicting the method of constructing a window insert assembly for a window using T-shaped stiffeners.

FIG. 22 depicts an exploded view of the window insert assembly 100D and also represents window insert assembly 100C with the exception that the Figure is absent of stiffener ribs 215C. It should be noted that a third short plank as depicted in FIG. 3 can also be used in the FIG. 22 embodiment. Two fasteners 188D are depicted at each junction, however, in some embodiments only one fastener is utilized. FIG. 23 depicts one end of a first long plank 154D. Note that stiffener groove 214D is inset into the center of outer perimeter 153D along both the long and short sides whereas, the stiffener groove is inset only into the long sides of the outer perimeter on the short planks.

It should be noted that different techniques can be used to join the elongate members. Although select embodiments herein may depict joining elongate members by mitred end, or by an end-to-side construction, embodiments of the disclosed invention are not limited to one technique or the other.

One embodiment of a method for assembling a window insert with a T-shaped stiffener 216C, 216D comprises the steps of: obtaining a first long plank, a second long plank, a first short plank, a second short plank and optionally a third short plank wherein each plank comprises an elongate stiffener groove. Arranging the planks to form an inner frame of the desired window insert profile whereby the stiffener groove is continuous about the outer perimeter of the inner frame (300). Arrange planks into window insert shape and advance screws through pre-formed holes in the planks thereby forming a secure inner frame (302). Cut two oversized pieces of heat shrink film sufficient to cover broad side of inner frame and tuck into the plank's T-groove (304). Placing a double sided tape on the front facing and rear facing surfaces of the planks (306). Obtaining and stretching a first plastic wrap across the broad side of the window and adhering it to the double-sided tape while leaving a perimeter portion of the first plastic wrap available for tucking into the adjacent stiffener groove (308). Obtaining and stretching a second plastic wrap across the broad side of the inner frame and adhering it to the double-sided tape while leaving a perimeter portion of the second plastic wrap available for tucking into the adjacent stiffener groove (310). Tucking the perimeter portion of the first and second plastic wrap into the stiffener groove (312). Obtaining a plurality of T-shaped stiffeners with a gasket adhered to the T top of the T-shaped stiffener and advancing the T-shaped stiffeners into the respective stiffener grooves (314). Appling heat to the heat shrink film on both sides of the window insert (316). Aligning and pressing the window insert into the window frame (318). Obtaining and utilizing fasteners as needed to secure the window insert in the window frame (320). Applying a facing shield if desired to cover exposed gasket (322).

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A window insert assembly configured for being fit within a window frame, the window insert assembly comprising:
- a planar inner frame assembly including a rectangular shape and defining a first broad side of the planar inner frame assembly, a second broad side of the planar inner frame assembly, and an outer perimeter of the planar inner frame assembly;
- a first plastic wrap fully covering the first broad side of the planar inner frame assembly and covering at least a first portion of the outer perimeter of the planar inner frame assembly;
- a second plastic wrap fully covering the second broad side of the planar inner frame assembly and covering at least a second portion of the outer perimeter of the planar inner frame assembly, wherein the second plastic wrap overlaps the first plastic wrap along the outer perimeter of the planar inner frame assembly;
- a first quantity of dual sided tape attached to the outer perimeter of the planar inner frame assembly and affixing the first plastic wrap to the outer perimeter, wherein the dual sided tape includes adhesive on both sides of the dual sided tape;
- a second quantity of the dual sided tape affixing the second plastic wrap in place about the outer perimeter;
- a plurality of U-channel members disposed over the outer perimeter the planar inner frame, wherein the plurality of U-channel members encapsulate edges of the first plastic wrap and edges of the second plastic wrap; and
- a compressible gasket disposed around an outer perimeter of the plurality of U-channel members.

2. The window insert assembly of claim 1, wherein the planar inner frame assembly includes:
- a first long plank;
- a second long plank;
- a first short plank; and
- a second short plank; and
- wherein the first long plank, the second long plank, the first short plank, and the second short plank collectively define a perimeter of the planar inner frame assembly.

3. The window insert assembly of claim 2, wherein the planar inner frame assembly further includes a third short plank disposed between the first short plank and the second short plank.

4. The window insert assembly of claim 1, wherein the plurality of U-channel members are constructed with one of plastic or aluminum.

5. The window insert assembly of claim 1, further comprising at least one facing shield attached to the planar inner frame assembly and configured to prevent view of the U-channel members and the compressible gasket.

6. The window insert assembly of claim 1, wherein the second quantity of the dual sided tape affixes the second plastic wrap to the first plastic wrap.

7. A method for installing a window insert assembly to a window frame, the method comprising:

measuring the window frame;

assembling the window frame insert, including:

cutting a first long plank, a second long plank, a first short plank, and a second short plank based upon the measured window frame in lengths configured to create a rectangular planar inner frame assembly with the first long plank, the second long plank, the first short plank, and the second short plank;

securing the first long plank, the second long plank, the first short plank, and the second short plank into the planner inner frame assembly with threaded fasteners;

cutting a first plastic wrap into a shape configured to fully cover a first broad side of the planar inner frame assembly and a first portion of an outer perimeter of the planar inner frame assembly;

cutting a second plastic wrap into a shape configured to fully cover a second broad side of the planar inner frame assembly and a second portion of the outer perimeter of the planar inner frame assembly;

disposing the first plastic wrap to cover the first broad side of the planar inner frame assembly and to cover the first portion of the outer perimeter of the planar inner frame assembly;

utilizing a first quantity of dual sided tape to secure the first plastic wrap about the perimeter of the planar inner frame assembly;

disposing the second plastic wrap to cover the second broad side of the planar inner frame assembly and to cover the second portion of the outer perimeter of the planar inner frame assembly, wherein the second plastic wrap overlaps the first plastic wrap along the outer perimeter of the planar inner frame assembly;

utilizing a second quantity of dual sided tape to secure the second plastic wrap about the perimeter of the planar inner frame assembly;

encapsulating the first plastic wrap and the second plastic wrap about the outer perimeter of the planar inner frame assembly with a plurality of U-channel members; and adhering a compressible gasket about an outer perimeter of the U-channel members; and fitting the window insert assembly into the window frame by compressing the compressible gasket and pushing the window insert assembly into the window frame.

8. The method of claim 7, further comprising attaching at least one facing shield to the planar inner frame assembly to prevent view of the U-channel members and the compressible gasket.

9. The method of claim 7, further comprising utilizing a heat gun to heat one of the first plastic wrap and second plastic wrap to remove wrinkles.

10. A window insert assembly kit for installing a window insert assembly to a window frame, the assembly kit comprising:

a plurality of elongate planks, wherein the plurality of elongate planks include a common thickness such that the plurality of planks are configured to be arranged into a planar inner frame assembly configured to fit within the window frame;

fasteners operable for securing the elongate planks into the planar inner frame assembly;

plastic wrap configured for covering a first broad side of the planar inner frame assembly and a portion of an outer perimeter of the planar inner frame assembly;

dual sided tape in sufficient length to secure the plastic wrap to the outer perimeter of the planar inner frame assembly around an entirety of the outer perimeter;

a plurality of U-channel members configured to be fit over an edge surface of the planar inner frame assembly and encapsulate the plastic wrap after it has been secured to the outer perimeter of the planar inner frame assembly; and a foam gasket configured to be adhered to an entire outer perimeter of the plurality of U-channel members after the U-channel members have been fit over the edge surface of the planar inner frame assembly;

wherein the elongate planks are operable to be trimmed according to measurements of the window frame; and wherein the foam gasket is configured to be compressed as the window insert assembly is installed to the window frame.

11. The window assembly kit of claim 10, wherein the plastic wrap is further configured for covering a second broad side of the planar inner frame assembly and a second portion of the outer perimeter of the planar inner frame assembly; and wherein the dual sided tape is sufficient in length to additionally secure the plastic wrap to the outer perimeter of the planar inner frame assembly.

* * * * *